May 27, 1952  C. F. WILBERSCHIED  2,598,477
CHUCK ATTACHMENT FOR BORING TOOLS
Filed July 28, 1947  2 SHEETS—SHEET 1
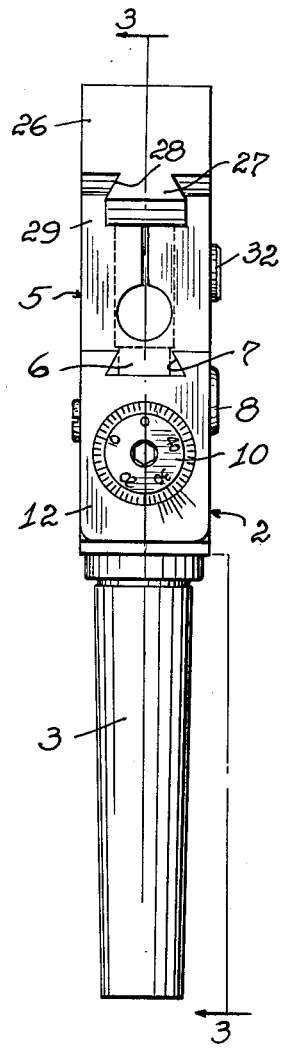
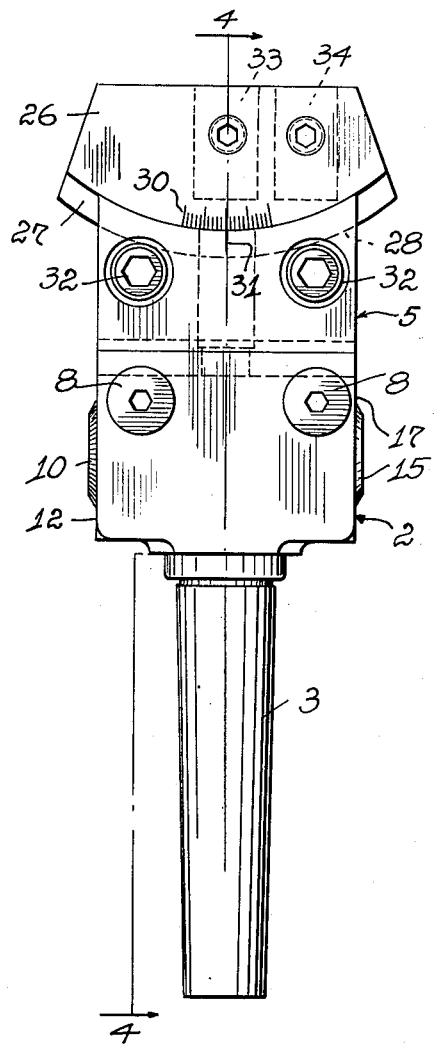
INVENTOR.
CHARLES F. WILBERSCHIED
BY
Gustav A. Wolff
ATT May 27, 1952   C. F. WILBERSCHIED   2,598,477
CHUCK ATTACHMENT FOR BORING TOOLS
Filed July 28, 1947   2 SHEETS—SHEET 2
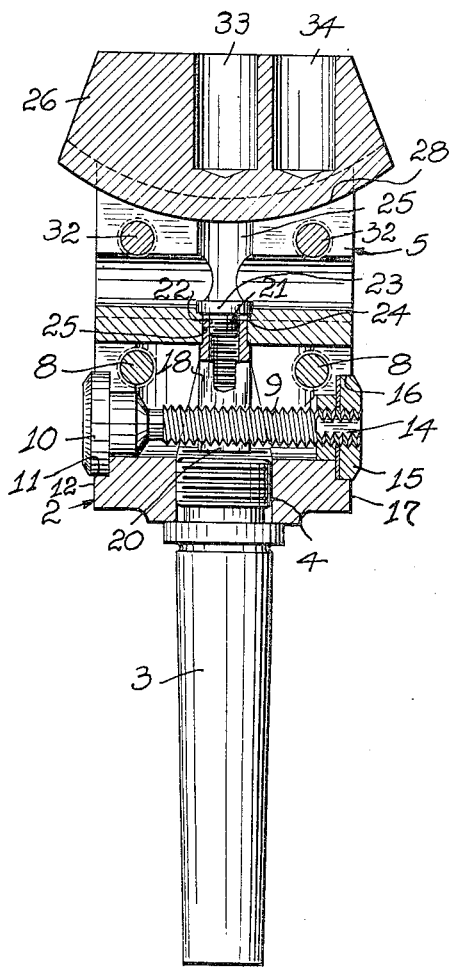
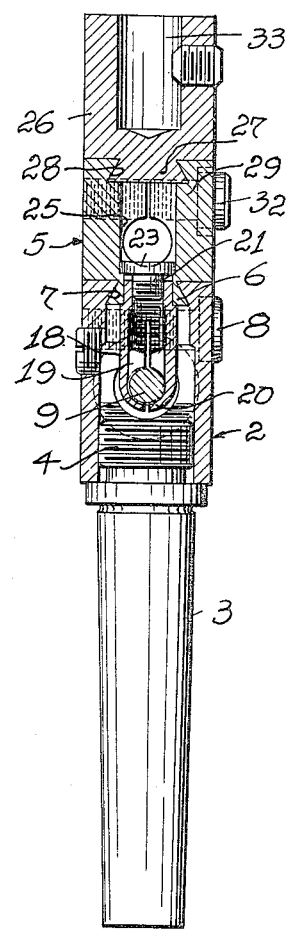
INVENTOR.
CHARLES F. WILBERSCHIED
BY Patented May 27, 1952

2,598,477

UNITED STATES PATENT OFFICE 2,598,477

CHUCK ATTACHMENT FOR BORING TOOLS

Charles F. Wilberschied, Cleveland, Ohio

Application July 28, 1947, Serial No. 764,043

1 Claim. (Cl. 279—6)

This invention relates in general to boring attachments for milling machines and, more particularly, to so-called eccentric boring attachments constructed with a head having a stem adapted to be held on the arbor of a milling machine and micrometrically adjustable tool supporting means slidably mounted on the head to variably position a boring tool or straight end mill relative to the work. Boring attachments of this type can be used only for boring cylindrical holes, as slidable mounting of the micrometrically adjustable tool supporting means permits only horizontal shifting of the tool supporting means, so that drilling and boring of taper holes is impossible.

The primary object of the invention is the provision of a boring attachment of the general type referred to above, which includes means permitting straight and inclined shifting of the tool supporting means relative to the work for drilling and milling cylindrical and taper holes with straight end mills.

Another object of the invention is the provision of a boring attachment of the general type referred to above which embodies a head mounting a micrometrically adjustable slide for horizontal shifting of such slide on the head, and tiltably mounted tool supporting means on the slide to permit variable positioning and tilting of a boring or milling tool of the straight end mill type relative to the work and drilling and milling of cylindrical and taper holes of various diameters with straight end mills.

In addition, the invention has other marked improvements and superiorities which radically distinguish it from presently known structures. These improvements or superior characteristics embodying certain novel features of construction are clearly set forth in the appended claim; and a preferred form of embodiment of the invention is hereinafter shown with reference to the accompanying drawing forming part of the specification.

In the drawing:

Fig. 1 is a front elevation of a boring attachment constructed in accordance with the invention.

Fig. 2 is a side elevation of the boring attachment shown in Fig. 1.

Fig. 3 is a transversal sectional view partly in elevation of the boring attachment, the section being taken on line 3—3 of Fig. 1; and Fig. 4 is a transversal sectional view partly in elevation of the boring attachment, the section being taken on the line 4—4 of Fig. 2.

Referring now in detail to the exemplified form of boring attachment shown in the drawing, reference numeral 2 defines a base member of substantially rectangular form which has extended therefrom a tapered shank 3 threadedly engaged at 4 with said member and adapted to fixedly mount the boring attachment in the arbor of a milling machine by means of which tool and holder are commonly rotated.

Base member 2 is vertically slitted and chambered and supports a slide member 5 shiftably engaged with said base member by a dovetailed rib 6 engaging a reentrant groove 7 in the split face of said base member, which rib and groove also serve to support slide member 5 against displacement from the base member. A pair of set screws 8 in base member 2 effect locking of slide 5 in selected positions when the split portions of the base member are forced toward each other by tightening of these set screws.

Slide 5 is adjusted micrometrically by means of a screw member 9 provided with an externally calibrated head 10, which screw member extends freely rotatably through the chambered base member, has its head 10 seated in a recess 11 of front wall 12 and has its end portion 14 nonrotatably secured to a collar 15 rotatably mounted in a recess 16 of rear wall 17 of the base member. Thus screw member 9 cooperates with a slitted member 18 which includes a vertically elongated passage 19 with a threaded bottom 20, threaded for engagement with screw member 9. Slitted member 18 is vertically shiftable with respect to screw member 9 and held in driving engagement therewith by a screw member 21 threaded into a bore 22 at the top of member 18. The screw member 21 rests with its head 23 on a shoulder 24 in vertical bore 25 of slide 5 and when screwed home draws threaded bottom wall 20 of member 18 into engagement with screw member 9. Slitted member 18 thus forms a downwardly extended portion of slide 5 and when engaged with screw member 9, as described above, will be shifted on base member 2 by rotation of such screw member. Such shifting permits selective positioning of a tool supporting holder 26 mounted on slide 5. This tool supporting holder is tiltably engaged with slide 5 by a dovetailed, circular rib 27 on holder 26, which rib engages a circular reentrant groove 28 in the slit top portion 29 of slide 5. Holder 26, which is suitably calibrated at 30 for registration with a mark 31 on slide 5 indicating the angular position of the holder on the slide 5, is locked in selected positions by two set screws 32 in slide 5.

Preferably, the tool supporting holder 26 is provided with a plurality of sockets 33, 34 for receiving and holding a boring tool or straight end mill in operative position, one of which sockets is nearly or quite coaxial with the tool supporting holder.

While I have shown and described a particular embodiment of my invention, it will be understood that the principles of my invention may be embodied in various structures specifically different from those herein disclosed, therefore my invention apprehends such modifications as come within the scope of the appended claim.

What I claim is:

A boring attachment for milling machines consisting of a head attachable to the arbor of a milling machine, a partly slitted tool supporting slide member micrometrically shiftably coupled with the head of the attachment, curved grooved means in the slitted part of the slide member, a tool support having curved rib means extended into and engaged with said curved grooved means in the slitted part of said slide member, the axis of said grooved means extending in a plane containing the slide axis of the slide member and being rectangularly related to the longitudinal axis of said head, and clamping means extended through the slitted part of said slide member adapted to frictionally lock the tool support in selected positions.

CHARLES F. WILBERSCHIED.

REFERENCES CITED

The following references are of record in the file of this patent:

UNITED STATES PATENTS

| Number | Name | Date |
| --- | --- | --- |
| 116,517 | Wheeler et al. | June 27, 1871 |
| 816,854 | Fernandez | Apr. 3, 1906 |
| 2,402,650 | Maffia | June 25, 1946 |
| 2,427,855 | Grunlan | Sept. 3, 1947 |

FOREIGN PATENTS

| Number | Country | Date |
| --- | --- | --- |
| 449,031 | Germany | 1927 |